(12) United States Patent
Verreaux

(10) Patent No.: US 8,650,178 B2
(45) Date of Patent: Feb. 11, 2014

(54) SYSTEMS, METHODS AND SOFTWARE FOR DISTRIBUTED LOADING OF DATABASES

(75) Inventor: Jon Michael Verreaux, Cottage Grove, MN (US)

(73) Assignee: Thomson Reuters Global Resources, Baar (CH)

( * ) Notice: Subject to any disclaimer, the term of this patent is extended or adjusted under 35 U.S.C. 154(b) by 0 days.

(21) Appl. No.: 12/819,847

(22) Filed: Jun. 21, 2010

(65) Prior Publication Data

US 2010/0332480 A1 Dec. 30, 2010

Related U.S. Application Data

(63) Continuation-in-part of application No. 11/328,499, filed on Jan. 9, 2006, now Pat. No. 7,480,644.

(60) Provisional application No. 60/642,351, filed on Jan. 7, 2005.

(51) Int. Cl.
*G06F 7/00* (2006.01)

(52) U.S. Cl.
USPC .......................................... 707/711; 707/796

(58) Field of Classification Search
USPC .................... 707/711, 796, 799, 811
See application file for complete search history.

(56) References Cited

U.S. PATENT DOCUMENTS

| | | | | |
|---|---|---|---|---|
| 6,353,834 | B1 * | 3/2002 | Wong et al. | 714/15 |
| 7,010,538 | B1 * | 3/2006 | Black | 707/636 |
| 7,206,805 | B1 * | 4/2007 | McLaughlin, Jr. | 709/203 |
| 7,257,689 | B1 * | 8/2007 | Baird | 711/162 |
| 7,290,056 | B1 * | 10/2007 | McLaughlin, Jr. | 709/230 |
| 7,844,835 | B2 * | 11/2010 | Ginter et al. | 713/193 |
| 2004/0039550 | A1 * | 2/2004 | Myers | 702/186 |
| 2004/0236826 | A1 * | 11/2004 | Harville et al. | 709/203 |
| 2005/0005019 | A1 * | 1/2005 | Harville et al. | 709/231 |
| 2005/0216421 | A1 * | 9/2005 | Barry et al. | 705/64 |
| 2005/0240621 | A1 * | 10/2005 | Robertson et al. | 707/102 |

* cited by examiner

*Primary Examiner* — James Trujillo
*Assistant Examiner* — Linh Black
(74) *Attorney, Agent, or Firm* — David Rosenblatt; Thomson Reuters

(57) ABSTRACT

The invention relates to an online information retrieval system having a queue for storing load requests and a set of two or more load managers for retrieving data from the queue and indexing documents based on the request retrieved from the queue. Each load manager resides in a different geographical location. A set of candidate documents comprise a unique identifier and a version indicator, wherein the unique identifier for each candidate document is identical for a given document and the version indicator is associated with a determination of which document within the set of candidate documents shall ultimately be communicated to a user.

10 Claims, 6 Drawing Sheets

|  |  | Load Completes Successfully at Site A | | | | Load is Unsuccessful at Site A |
| --- | --- | --- | --- | --- | --- | --- |
|  |  | Replication and Distribution Successful | Replication Verification Unsuccessful | Index Distribution Unsuccessful | Replication and Distribution unsuccessful |  |
| Load Completes Successfully at Site B | Replication and Distribution Successful | A document in this load will always be available | A document in this load will always be available | A document in this load will always be available | A document in this load will always be available | A document in this load will always be available |
|  | Replication Verification Unsuccessful | A document in this load will always be available | If a primary DOC goes down, you have a 50% chance of not being able to pull the document. | If a primary DOC goes down, you have a 50% chance of not being able to pull the document. | If a primary DOC goes down, you have a 50% chance of not being able to pull the document. | If a primary DOC at site B goes down, you may not being able to pull the document. |
|  | Index Distribution Unsuccessful | A document in this load will always be available | If a primary DOC goes down, you have a 50% chance of not being able to pull the document. | A document in this load is available – Alert if this condition persists | If a primary DOC goes down, you have a 50% chance of not being able to pull the document. | If the primary/load indexes at site B are unavailable, you will not find this document. |
|  | Replication and Distribution unsuccessful | A document in this load will always be available | If a primary DOC goes down, you have a 50% chance of not being able to pull the document. | If a primary DOC goes down, you have a 50% chance of not being able to pull the document. |  | If the primary/load indexes at site B are unavailable, you will not find this document. If a primary DOC at Site B goes down, you will not being able to pull the document. |
| Load is Unsuccessful at Site B | | A document in this load will always be available | If a primary DOC at site A goes down, you may not being able to pull the document | If the primary/load indexes at site A are unavailable, you will not find this document. | If the primary/load indexes at site A are unavailable, you will not find this document. If a primary DOC at Site A goes down, you will not being able to pull the document. | Document not available |

FIGURE 4

SYSTEMS, METHODS AND SOFTWARE FOR DISTRIBUTED LOADING OF DATABASES

RELATED APPLICATION

This application is a continuation-in-part of U.S. application Ser. No. 11/328,499 filed Jan. 9, 2006, now U.S. Pat. No. 7,480,644 issued on Jan. 20, 2009, which claims priority to U.S. Provisional Application 60/642,351 filed on Jan. 7, 2005, the contents of which are all incorporated herein in their entirety.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright © 2010 Thomson Reuters.

TECHNICAL FIELD

Various embodiments of the present invention concern information retrieval, particularly systems, methods and software for loading data into databases.

BACKGROUND

Today, people are increasingly looking for more information online. Due to this increase, online information retrieval systems have to provide the most current content in order to be and stay competitive. In order to stay current, an online information retrieval system must be able to continuously load new documents quickly and efficiently onto the system. Currently, U.S. Pat. No. 7,480,644 addresses the problem of relying on a single server when loading documents onto a database associated with an online information retrieval system. The '644 patent discloses utilizing distributed load domains to organize and coordinate operation of multiple load servers to meet load capacity needs of a set of one or more databases/collections. In addition, two or more load monitor servers not only monitor and ensure completion of load tasks in individual load servers, but also provide for one load monitor to monitor performance of another. The '644 patent is directed toward large document loads that can take several minutes to complete (for example, 200,000 documents could take up to an hour to complete). However, even smaller document loads (1-3 documents) could take in the high tens of seconds (for example 30-40 seconds) to complete.

Unfortunately, the '644 patent does not address the problem of being able to load continuously (i.e. 24 hours a day, 7 days a week, 365 days a year). The multiple load servers reside within one geographical location (i.e. data center). In many instances, a malfunction or crash within that data center necessitates the reloading of the entire quantity of data. In addition, the solution in the '644 patent only allows a database/collection to receive one load at a time (i.e. the load may contain several documents or one document). This "one at a time" loading process extends the time it takes to load documents. Consequently, the lack of continuousness and time considerations could delay access, by a user or subscriber, to the new documents. This is especially critical if documents are time-sensitive and need to be loaded in the quickest time frame possible.

Accordingly, the inventors have recognized additional improvements in loading databases/collections of online information retrieval system.

SUMMARY

To address this and/or other needs, the present inventors have devised systems and methods for distributing loading of information retrieval systems. More specifically, in one form, the invention comprises an online information retrieval system having a queue for storing load requests and a set of two or more load managers for retrieving data from the queue and indexing documents based on the request retrieved from the queue. Each load manager resides in a different geographical location. Further, there is a set of candidate documents wherein each candidate document comprises a unique identifier and a version indicator. The unique identifier for each candidate document is identical and the version indicator is associated with a determination of which document within the set of candidate documents shall ultimately be communicated to a user.

Advantageously, exemplary embodiments of the present invention load a document to two different quick content collections located at different geographical locations to provide an efficient content load solution. Using this type of arrangement, if one data center malfunctions or crashes, the other location (and collection) is still available for load processing. The quick content collections are kept to a threshold storage size to reduce hardware costs and reduce content loading time. To keep the content collections within that threshold, the system loads the final version of the document to a main collection and then deletes the document from both quick content collections. The main collection can reside at any geographical location including the two geographical locations of the quick content collections.

Additionally, the exemplary embodiments have the functionality to load documents to the same collection at the same time thus further reducing the amount of loading time. These efficiencies reduce the overall amount of loading time (e.g. total loading time 5-10 seconds) it takes to add the new documents to an online information retrieval system.

BRIEF DESCRIPTION OF THE DRAWINGS

FIG. 4 is a table of an exemplary matrix on load statuses which corresponds to one or more embodiments of the invention.

DETAILED DESCRIPTION OF EXEMPLARY EMBODIMENTS

This description, which incorporates the figures and the claims, describes one or more specific embodiments of an invention. These embodiments, offered not to limit but only to exemplify and teach the invention, are shown and described in sufficient detail to enable those skilled in the art to make or use the invention. Thus, where appropriate to avoid obscuring the invention, the description may omit certain information known to those of skill in the art.

Figure 1:
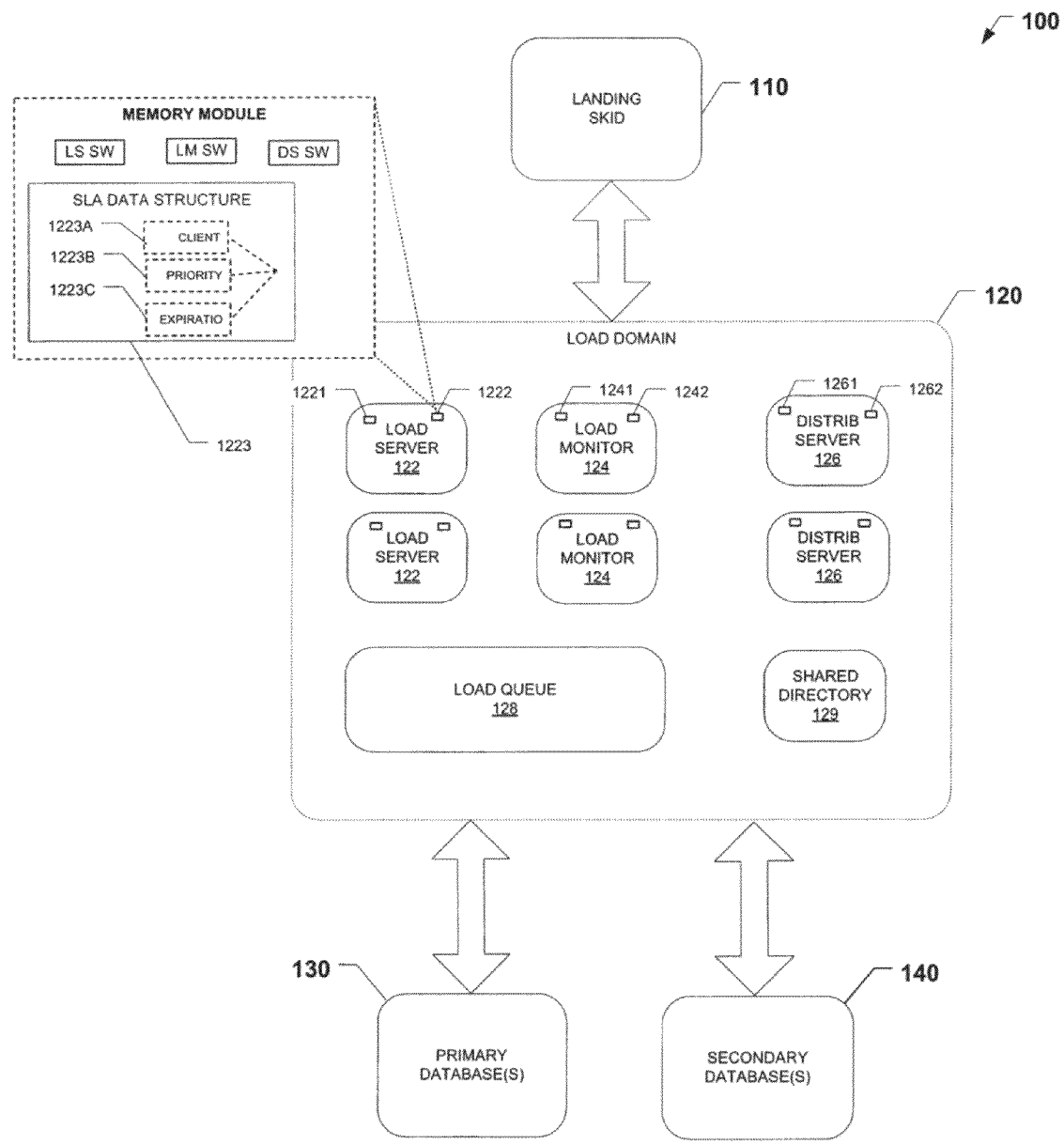
FIG. 1 is a block diagram of an exemplary system which corresponds to one or more embodiments of the invention.

FIG. 1 shows an exemplary information retrieval system 100 incorporating teachings of the present invention. System 100 includes a landing skid database 110, a load domain 120, a primary database 130, and a secondary database 140.

Landing skid database 110 receives and stores new or updated files for addition to system 100, or primary database 130. In the exemplary embodiment, landing skid database 110 takes the form of a network accessible storage (NAS) device and receives and stores files in an extensible-markup-language (XML) format. The files include documents with a command-script type header information that includes a globally unique document identifier (GUID) and a database command, such as add or delete. Examples of documents include but are not limited to judicial, financial, news, healthcare, scientific, and tax documents. In addition, types of documents include but are not limited to a complete text of a document, portion of text of a document, multiple portions of text combined from multiple documents, notes, and annotations.

Load domain 120 includes a set of one or more load servers 122 (two shown), a set of two or more load monitor servers 124 (two shown), a set of one or more distribution servers 126 (two shown), a load queue 128, and a shared directory 129. In the exemplary embodiment each of the servers is logically associated with a load domain, which is itself associated with one or more document collections or databases, such as primary database 130. (In the exemplary embodiment, a load domain includes one or more load boxes that have shared access to a landing skid and load index files. Any load box in a load domain can service any collection that is part of that load domain.

Servers 122, 124, and 126 include respective processing modules 1221, 1241, and 1261 and respective memory modules 1222, 1242, and 1262. Each of the processing modules includes one or more processors or processing circuits, for example dual processors. And, each of the memory modules includes machine-executable instructions (software or SW) for causing the respective processing modules to perform acts as described below in the exemplary method section. Moreover, in the exemplary embodiment, each of the servers includes the instructions of each of the other servers, enabling, for example, a load server (LS) to be readily operated as a load monitor server (LM) or a distribution server (DS). Those skilled in the art will appreciated that one may implement any servers as a server blade. A server blade is a single circuit board populated with components such as processors, memory, and network connections that are usually found on multiple boards. Server blades are more cost-efficient, smaller and consume less power than traditional box-based servers.

Additionally, each of load servers 122 includes or is associated with a service-level-agreement (SLA) data structure which governs operational context of the load server. SLA data structure 1223, which is representative, includes a client field 1223A for indicating the databases or database collections to which the load requests (e.g. a request to load documents or a file containing documents) or other work to be accepted by the associated load server pertains; a priority field 1223B for indicating a minimum priority of the load requests or other work to be accepted by the associated load server; and a temporal indicator 1223C for indicating related temporal aspects of the service level agreement, such as the effective period or duration of the agreement. Some embodiments provide for two SLA data structures, a permanent one and a temporary one, with the temporary one having a life that expires after a predetermined time period and allows the permanent SLA data structure to automatically reinstate. Thus, for example, a user, using a GUI (graphical user interface) not shown may dedicate one or more of the load servers to handling load requests for a specific database, such as U.S. Supreme Court, or to handling load requests based on priority. The SLA would be in effect for several, hours, days, weeks, or even longer before automatically expiring and allowing reinstatement of the permanent SLA.

In some embodiments, each load monitor server 124 operates using the following parameters:

Distributed_Load_Shared_Directory identifies the path to shared directory where information is written by the load monitors;

Distributed_Load_Directory_Monitor_Interval, for example 300000 milliseconds, denotes the amount of time in milliseconds before the non-active or secondary load monitor rechecks the landing skid for new requests;

Distributed_Load_Working_File_Monitor_Interval, for example 300000 milliseconds, denotes the amount of time before the non-active Load Monitor rechecks the working file modification time;

Distributed_Load_Completed_Requests_Monitor_Interval, for example 300000 milliseconds, denotes the amount of time in ms before the non-active Load Monitor rechecks load queue 128 for completed requests.

Load queue 128 provides a queuing function for use in managing work flow of the load domain. In the exemplary embodiment, the queue is accessible by servers 122, 124, and 126.

Shared directory 129 functions as a communications intermediary. It is accessible to other components or servers in the load domain, such as all the other load monitors in load domain 120. In the exemplary embodiment, the shared directory is part of a NAS device and is used to exchange information from one load monitor to another as described below. In some embodiments, the shared directory can be a part of the landing skid database 110. In some embodiments with multiple load domains, each load domain includes its own set of load monitors comprising its own respective shared directory.

Primary database 130 and secondary database 140 are redundant or mirror-image databases. In some embodiments they are maintained at separate sites to reduce risk of catastrophic failure. Although not shown in the figure, users or subscribers access primary database 130 using a client device, such as personal computer over a local or wide-area network. Also, those skilled in the art will appreciate that users or subscribers do not know which database of a specific content/information solutions provider the user or subscriber is accessing. To the user/subscriber, it does not matter as long as correct, pertinent, information is provided in a timely fashion.

Highly Available Content Load

Figure 2:
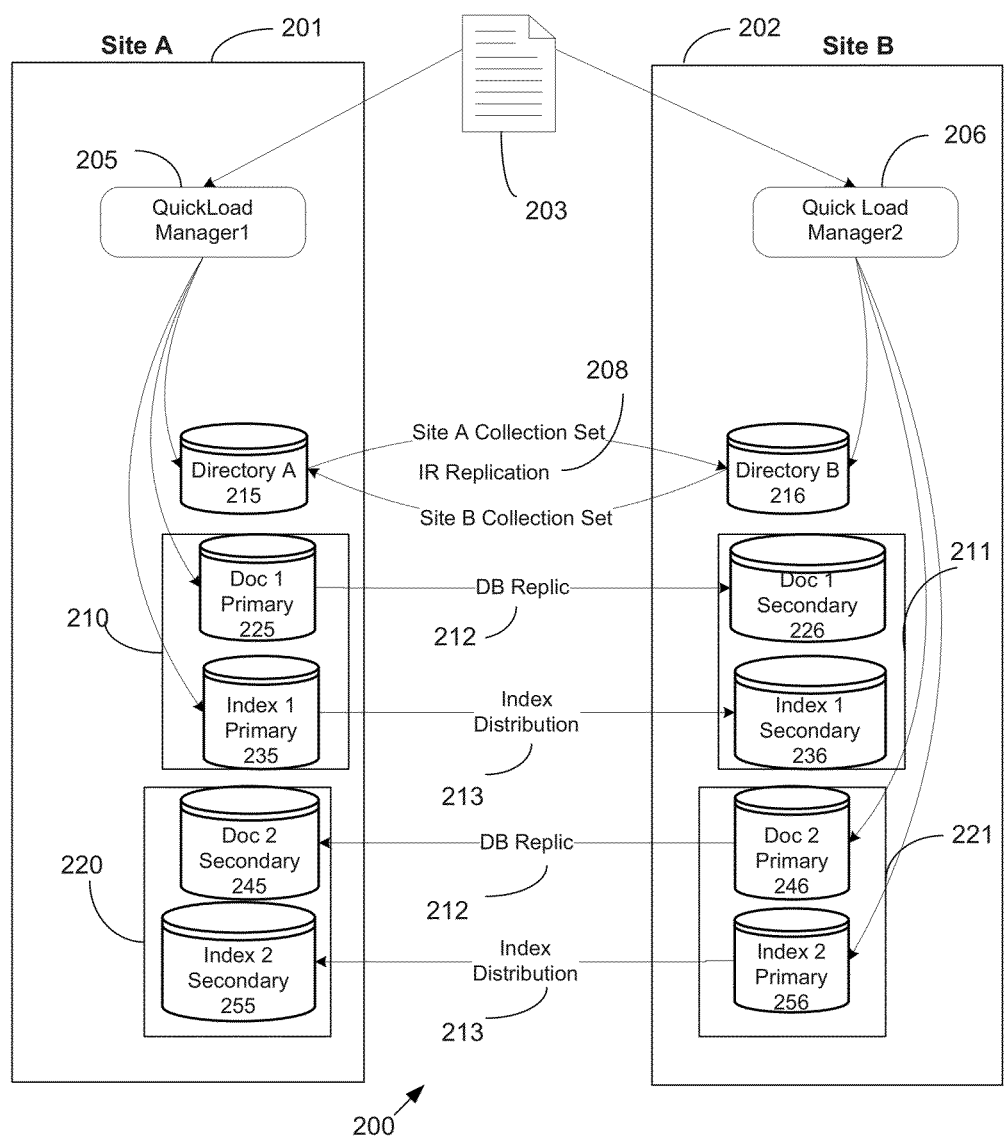
FIG. 2 is a diagram which corresponds to one or more embodiments of the invention.

In the exemplary embodiments described below, a load manager is also known as a load server. In addition, the exemplary embodiments described below refer to a load containing a single document and/or loading a single document. One of ordinary skill in the art would recognize and appreciate various other embodiments regarding the load process including a load containing several documents and/or loading several documents. FIG. 2 shows an exemplary diagram 200 incorporating teachings of the present invention. The diagram includes a document 203, site A 201, site B 202, quick load manager1 205, quick load manager2 206, directory A 215, directory B 216 and two quick content collections 210 and 221. A document 203 is loaded to both site A 201 and site B 202. Site A 201 includes a quick load manager 205 and a quick content collection 210 wherein the quick content collection includes a primary document database 225 and a primary index database 235. Site B 202 includes a quick load manager 206 and a quick content collection 221 wherein the quick content collection includes a primary document database 246 and a primary index database 256. Each quick content collection must reside at a different physical location/site. For example, a quick content collection could reside at a site in Minneapolis, Minn. whereas the other quick content collection could reside at a site in Tokyo, Japan. Additionally, a quick content collection could reside at a site in Minneapolis, Minn. whereas the other quick content collection could reside at a site in Minneapolis, Minn. only yards away from the first site in Eagan, Minn. Thus, the different geographical locations for, e.g., the different quick content collections, are not defined by how "close" they are in distance but rather by how isolated they are from the malfunctions, electrical failure or "crashing" of each other. These quick content collections are utilized to make the content loading process highly available. Elements of a highly available loading process include successfully loading content no matter what the circumstances (i.e. power outage, natural disaster, system malfunction, etc.) and successful loading within a given time frame (for example 15 seconds). A load is successful as long as one load completes to one of the quick content collections. It is not necessary to have a successful load occur to each of the quick content collections.

Figure 3:
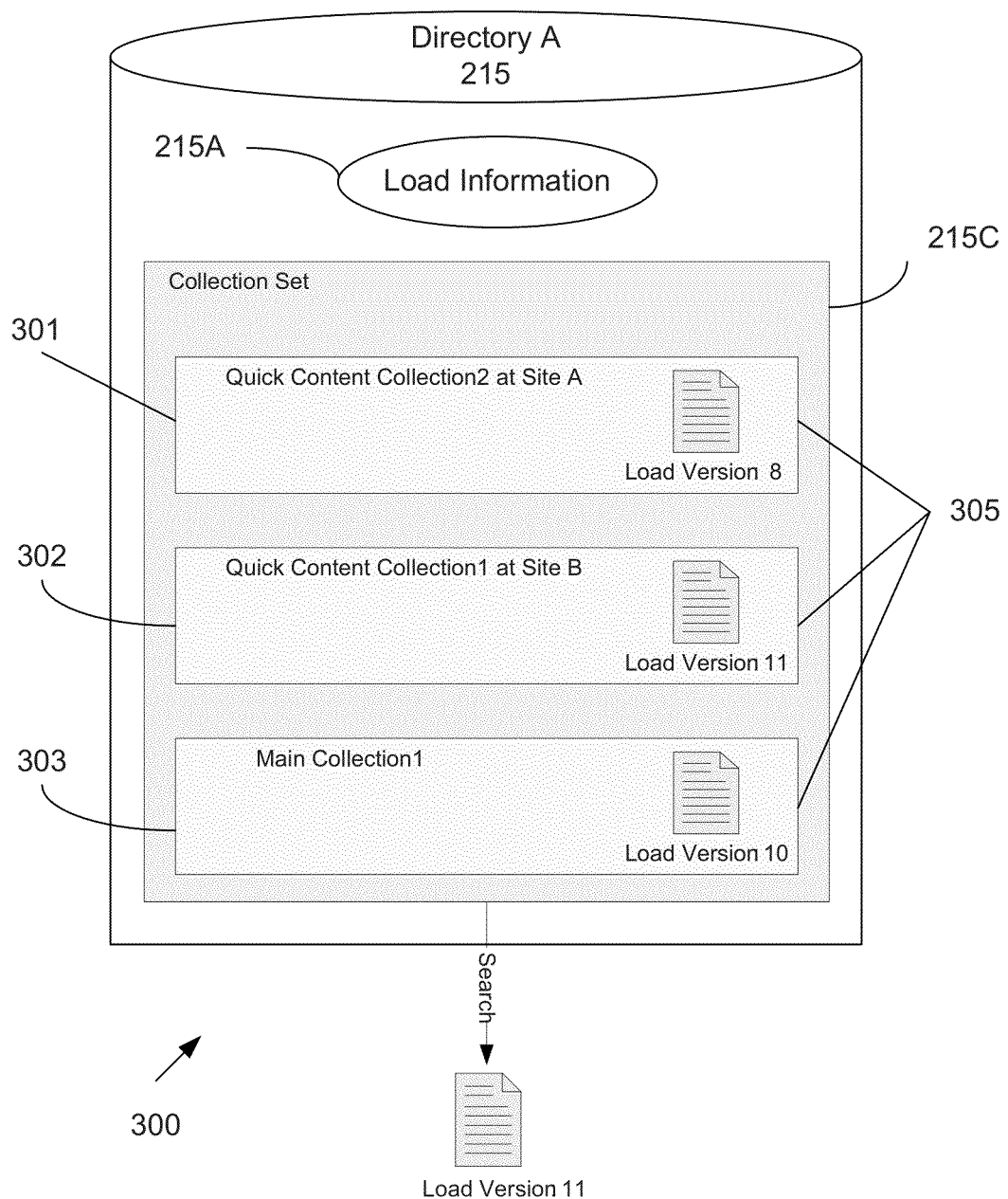
FIG. 3 is a diagram which corresponds to one or more embodiments of the invention.

The quick load managers 205, 206 have the ability to read and/or write to the site directory 215, 216, respectively. FIG. 3 shows exemplary contents of directory A 215. Directory A 215 includes load information 215A, a collection set 215C and three collections: Quick Content Collection 2 at Site A 301, Quick Content Collection) at Site B 302 and Main Collection) 303. The quick load manager 305 is responsible for making sure that the collections 301, 302, 303 are always up to date. Once any of the collections within the collection set are modified, the modification is immediately available to anyone searching the collection set. The load information 215A (i.e. updating and/or adding information about a load) and cleanup of residual information (i.e. removal of old and/or unused information) are written only to directory A 215. The same process applies for site B. For example, loads and/or cleanups at site A 201 write to directory A 215 and loads and/or cleanups at Site B 202 write to directory B 216. In this exemplary embodiment, a quick load manager 205 writes to one directory 215. If that directory 215 is not available, the load fails (no failover to directory B) and the cleanup of residual information does not occur. Directory A 215 also contains a collection set 215C. This collection set 215C includes multiple collections 301, 302, 303 which in turn contain content (i.e. documents, files, etc). Referring back to FIG. 2, a replication function 208 occurs between directory A 215 and directory B 216 (in particular the collection set). The replication function 208 includes replication of site A's 201 collection set 215C to site B's 202 directory B 216 and vice versa. The replication function 208 ensures that the online information retrieval system has an up-to-date collection set to search. For example, the online information retrieval system searches a primary site's collection set to ultimately retrieve a document. If the primary site is unavailable, the replication process 208 has supplemented the secondary site's collection set with the index from the primary site's collection set, therefore, searching the secondary site's collection set instead. This capability allows for the retrieval of a document under almost any circumstances.

Furthermore, site A 201 contains a primary load cluster 210 and secondary replication cluster 220. Site A's 201 primary load cluster 210 includes DOC1 Primary 225 and Index1 Primary 235. Site A's 201 secondary replication cluster 220 includes DOC2 Secondary 245 and Index2 Secondary 255. Site B 202 contains a primary load cluster 211 and secondary replication cluster 221. Site B's 202 primary load cluster 221 includes DOC2 Primary 246 and Index2 Primary 256. Site B's 202 secondary replication cluster 211 includes DOC1 Secondary 226 and Index1 Secondary 236. Preferably, each primary load cluster 210, 221 and each secondary replication cluster 220, 211 should reside on a separate, independent physical storage device. The primary load clusters 210, 221 assist in the loading process while the secondary replication clusters 220, 211 assist in the online information retrieval process when failover occurs and the primary load clusters 210, 221 are not available.

In another exemplary embodiment, back-up functionality is provided for the online information retrieval system. Exemplary functionalities includes database replication (DB replication) 212 and index file distribution (index distribution) 213. The DB replication function 212 replicates the database and transmits that information to a secondary replication cluster. The index distribution function 213 transmits the index file to the secondary replication cluster. In addition, a time limit could be set on the database replication function (DB replication) 212 and index file distribution function (index distribution) 213. For example, if Site A 201 were to be down, then the online information retrieval system could retrieve the information from the secondary replication cluster 211 of Site B 202. If these processes do not complete in a given time frame, the load disengages from the replication verification 212 and index distribution 213 and returns with a successful load status. Consequently, an indicator is also returned with the load status that either the replication verification, index distribution or both were not completed. If however during the next load, the load, the verification of DB Replication 212 and the Index Distribution 213 are completed then the previous incomplete DB Replication 212 and the Index Distribution 213 were also transmitted to the secondary replication cluster. For example, Load 3 is successful but does not complete DB Replication 212 and the Index Distribution 213. Next, an exemplary system begins Load 4 and it is successful. Additionally the DB Replication 212 and the Index Distribution 213 were also complete for Load 4. Since Load 4 completed its load, the DB Replication 212 and the Index Distribution 213, the exemplary system recognizes that Load 3 DB Replication 212 and the Index Distribution 213 did not complete and makes sure those steps complete if possible. Therefore, the load tries to go back and complete any incomplete load status gaps to make sure the exemplary system has a complete load, DB Replication and Index Distribution.

FIG. 4 illustrates an exemplary matrix that provides information on how to interpret the load statuses that are returned by an exemplary system. Note that only under the condition of the load not being successful at either Sites A or B is the document not available. While this scenario is unlikely given the fact that these sites are in different geographical location, one of ordinary skill in the art realizes that more than two sites could be utilized to further minimize an overall unsuccessful load. The exemplary matrix information is also utilized by a publisher to access the risk and send out alerts if needed.

Figure 5:
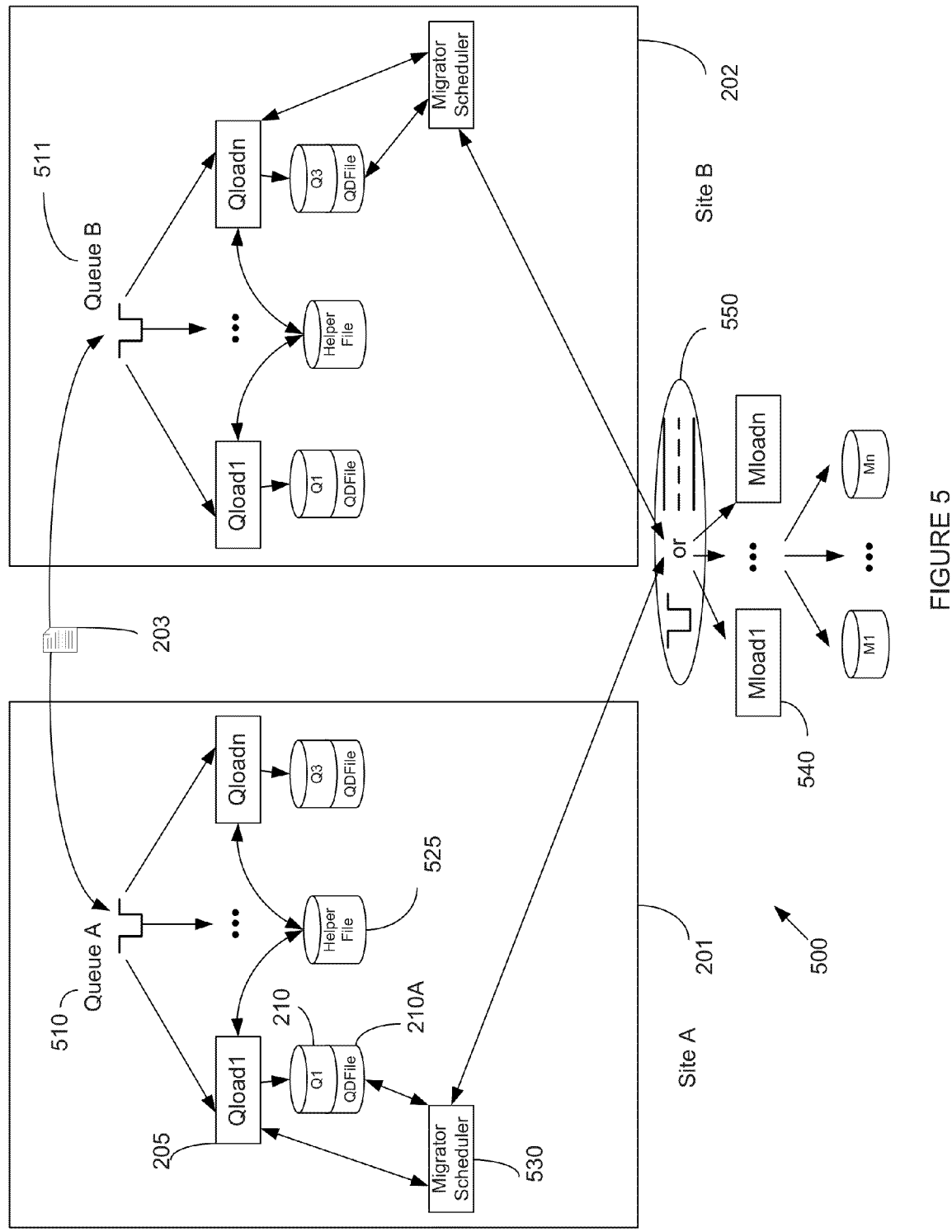
FIG. 5 is a diagram which corresponds to one or more embodiments of the invention.

FIG. 5 depicts an exemplary automatic migration system that may be used to transfer content from a quick content collection to a main collection without any down time. In an exemplary embodiment, quick load manager 205 (i.e. QLoad1) is shut down and content is extracted. Each document contained within the quick content collection 210 is separated by main collection M1 . . . Mn. This separation occurs due to an additional tag associated with each document 203 indicating the main collection M1 . . . Mn. This exemplary embodiment can support 1 to n quick content collections and/or main collections. A document 203 is loaded to any of the quick content collections Q1 . . . Qn on either site A 201 or site B 202. For example, a document could be loaded to quick content collection Q1 210 on site A 201 on one load and to quick content collection Q3 520 on site B 202 on the next load. A quick content collection and quick load manager have a one-to one relationship. In other words, there is only one quick load manager associated with one quick collection (e.g. QLoad1 205 is solely associated with Q1 210). On the other hand, each main load manager communicates with all main collections (e.g. Mload1 540 associates with all main collections M1 . . . Mn). The quick load manager caches index files and database connections to support faster loading. The migrator scheduler 530 shuts down one quick load manager 205 and quick content collection 210 pair at a time and initiates the migration of the quick content collection's content to the main queue/landing skid 550. Migration may occur every hour or less to maintain quick content collections below a storage size threshold. From the main queue/landing skid 550, a main load manager 540 places the content into the proper main collection M1 . . . Mn based on the collection tag associated with the document 203. The other quick load managers continue to load documents. There is one quick load queue 510, 511 for each load domain (not pictured) at each site area 201, 202, respectively. For example, QLoad1 205 within site A 201 pulls any document 203 from only Queue A 510 to process.

A quick delete file (QDFile) 210A is used by the search functionality and the migration process to manage explicitly deleted and updated documents. A QDFile 210A has a document GUID and D/T field. The search functionality uses QDFile 210A to remove, from a set of candidate documents, all found documents that have been explicitly deleted in one quick content collection but have a later version in another quick content collection or main collection. Search functionality also utilizes QDFile 210A to remove, from a set of candidate documents, all found documents that may have a new version of the document that was not included in the search result. The migration process uses QDFile 210A to apply explicit delete indicators on the documents in the main collection. The explicit delete indicators are lost when cleanup on quick content collection occurs. A QDFile is created by either a main or quick load manager if an older document is found in the main collection or if an older document is found in another quick content collection (a helper file is used). For example a QLoad1 205 uses helper file 525 as an authority of existing documents. The helper filer 525 stores document GUID, D/T, and collection name. This helper file 525 provides information of the documents loaded to the quick content collection 210 and is used to generate a QDFile 210A if the document 203 exists in another quick content collection. Additionally, the helper file 525 allows the quick load manager 205 to mark the document 203 for deletion if a new version of the document exists in another quick content collection.

Figure 6:
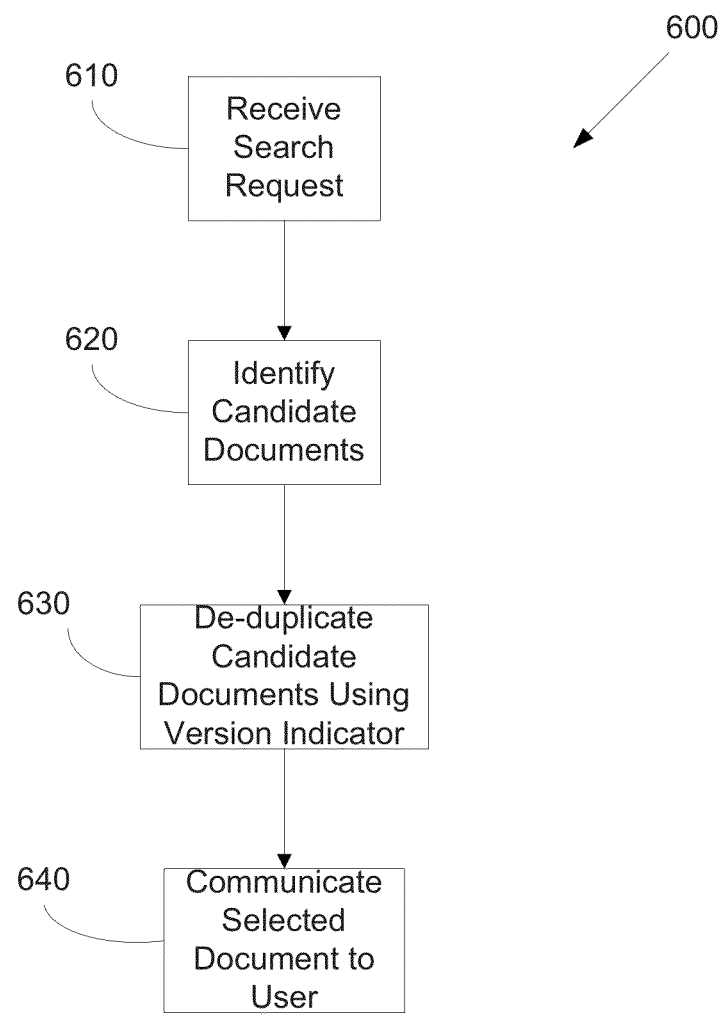
FIG. 6 is a flowchart of an exemplary method which corresponds to one or more embodiments of the invention.

In FIG. 6, a search request is received by the online information retrieval system 610. This search request includes a user's search query along with any other information that the system needs to complete the search request. After receiving the search request 610, the online information retrieval system gets a list of the quick content collections 301, 302 and main collections 303 in the collection set 215C that resides on the primary site A's 201 directory A 215. The collection set has no physical documents but is a logical set of documents. All physical documents come from a quick content and/or main collection. The addition of documents to a collection set includes adding a new collection to the list of collections in a collection set. Each quick content collection 301, 302 and main collection 33 within directory A are searched and an identification step 620 begins. The identification step 620 identifies one or more candidate documents with the same GUID in the quick content collections and main collections based on the search request. For example, if the online information retrieval system uses site A 201 as the primary site to search, the identification step 620 searches each quick content collection Q1 . . . Q3 and each main collection M1 . . . Mn for a certain GUID within site A's 201 directory A 215. The identification step 620 may result in having multiple documents with the same GUID (i.e. candidate documents) due to the fact that the document can reside in multiple collections. The next step de-duplicates these candidate documents using a version indicator 630. A version indicator 305 (i.e. date/timestamp (D/T)) is used to de-duplicate when several candidate documents have the same GUID. Each document loaded to a quick content collection and/or main collection needs to support a version indicator 305. This allows the search functionality to de-duplicate each load version/version indicator 305 from each quick content collection and each load version/version indicator 305 from each main collection of the document that may exist. Referring back to FIG. 3, this exemplary embodiment includes a collection set 215C which contains three collections: Quick Content Collection 2 at Site A 301, Quick Content Collection) at Site B 302 and Main Collection) 303. In this example, each collection has a load version 305 (i.e. version indicator) of the current document. When a search request is executed to retrieve the document, all three documents become candidate documents because their GUIDs are identical. However, only load version 11 is returned to the user because that document has the latest load version number 305. A reason for retrieving all candidate documents that have the same GUID is to make sure that no matter where the latest version of the document resides, the search functionality retrieves the latest version and is able to communicate that version to the user. After the de-duplication step 630, a document with the latest version indicator (i.e load version), if any, is communicated to the user 640. This communication step 640 can occur by displaying the document to the user, emailing the document to the user, printing the document for the user or any other communication step known to those of ordinary skill in the art for allowing the user to gain access to the document.

CONCLUSION

The embodiments described above and in the claims are intended only to illustrate and teach one or more ways of practicing or implementing the present invention, not to restrict its breadth or scope. The actual scope of the invention, which embraces all ways of practicing or implementing the teachings of the invention, is defined by the claims and their equivalents.

The invention claimed is:

1. A system comprising:
   a. a primary quick load manager, the primary quick load manager executable by at least one of a processor and a memory coupled to the processor, wherein the primary quick load manager resides in a first geographical location and is configured to:
      i. retrieve at least one publishing load request, wherein the at least one publishing load request comprises at least one request to load at least one document;
      ii. load the at least one document to a primary quick content collection, wherein the primary quick content collection resides in the first geographical location; and
      iii. read and/or write to a primary directory, wherein the primary directory resides in the first geographical location and is associated with the primary quick content collection;
   b. the primary directory associated with the primary quick load manager and configured to:
      i. receive a replication of a secondary collection set from a secondary directory, wherein the secondary directory resides in a second geographical location and is associated with a secondary quick load manager, wherein the second geographical location and the first geographical location are different;
      ii. store a primary collection set, wherein the primary collection set comprises a logical representation of each of the primary quick content collection, the replication of the secondary collection set and at least one main collection; and
      iii. send a replication of the primary collection set to the secondary directory; and
   c. a set of candidate documents, wherein the set of candidate documents is determined from within the primary collection set, wherein each candidate document comprises a unique identifier and a version indicator, wherein the unique identifier for each candidate document is identical and the version indicator is associated with a determination of which document within the set of candidate documents shall be communicated to a user; and
   wherein the primary quick load manager is associated with a service-level-agreement data structure, the data structure comprising a first field for identifying which quick collections the primary quick load manager is permitted to index documents, a second field for indicating a priority threshold of document indexing requests that the primary quick load manager is permitted to accept and a third field indicating a temporal aspect.

2. The system of claim 1, wherein
   a. the secondary quick load manager is configured to:
      i. retrieve the at least one publishing load request;
      ii. load the at least one document to a secondary quick content collection, wherein the secondary quick content collection resides in the second geographical location; and
      iii. read and/or write to the secondary directory, wherein the secondary directory is associated with the secondary quick content collection; and
   b. the secondary directory coupled to the secondary quick load manager and configured to:
      i. receive the replication of the primary collection set from the primary directory;
      ii. store the secondary collection set in the secondary directory, wherein the secondary collection set comprises a logical representation of each of the secondary quick content collection, the replication of the primary quick content collection and at least one main content collection; and
      iii. send the replication of the secondary collection set to the primary directory.

3. The system of claim 2, further comprising:
   a. a determination that the primary collection set is unavailable for searching for the set of candidate documents; and
   b. the set of candidate documents, responsive to the determination of an unavailable primary collection set, is determined from within the secondary collection set, wherein each candidate document within the set of candidate documents comprises a unique identifier and a version indicator, wherein the unique identifier for each candidate document is identical and the version indicator is associated with a determination of which document within the set of candidate documents shall be communicated to a user.

4. The system of claim 1, further comprising a migrator scheduler for migrating documents from the primary quick content collection to the at least one main collection.

5. The system of claim 1, wherein the version indicator comprises a date and time stamp.

6. A method comprising:
   a. retrieving, via a primary quick load manager, at least one publishing load request, wherein the at least one publishing load request comprises at least one request to load at least one document and the primary quick load manager resides in a first geographical location;
   b. loading the at least one document to a primary quick content collection coupled to the primary quick load manager, wherein the primary quick content collection resides in the first geographical location;
   c. reading and/or writing to a primary directory, wherein the primary directory is coupled to the primary quick load manager;
   d. receiving a replication of a secondary collection set from a secondary directory, wherein the secondary directory resides in a second geographical location and is associated with a secondary quick load manager, wherein the second geographical location and the first geographical location are different; and
   e. storing a primary collection set in the primary directory, wherein the primary collection set comprises a logical representation of each of the primary quick content collection, the replication of the secondary collection set and at least one main content collection;
   f. sending a replication of the primary collection set to the secondary directory; and
   g. searching the primary collection set for a set of candidate documents, wherein each candidate document within the set of candidate documents comprises a unique identifier and a version indicator, wherein the unique identifier for each candidate document is identical and the version indicator is associated with a determination of which document within the set of candidate documents shall be communicated to a user; and
   wherein the primary quick load manager is associated with a service-level-agreement data structure, the data structure comprising a first field for identifying which quick collections the primary quick load manager is permitted to index documents, a second field for indicating a priority threshold of document indexing requests that the primary quick load manager is permitted to accept and a third field indicating a temporal aspect.

7. The method of claim 6, further comprising:
a. retrieving, via the secondary quick load manager, the at least one publishing load request;
b. loading the at least one document to a secondary quick content collection, wherein the secondary quick content collection resides in the second geographical location;
c. reading and/or writing to the secondary directory, wherein the secondary directory is coupled to the secondary quick load manager;
d. receiving the replication of the primary collection set from the primary directory;
e. storing the secondary collection set in the secondary directory, wherein the secondary collection set comprises a logical representation of each of the secondary quick content collection, the replication of the primary collection set and at least one main content collection; and
f. sending the replication of the secondary collection set to the primary directory.

8. The method of claim 7, further comprising:
a. determining the primary collection set is unavailable for searching for the set of candidate documents; and
b. searching, in response to an unavailable primary collection set, the secondary collection set for the set of candidate documents, wherein each candidate document within the set of candidate documents comprises a unique identifier and a version indicator, wherein the unique identifier for each candidate document is identical and the version indicator is associated with a determination of which document within the set of candidate documents shall be communicated to a user.

9. The method of claim 6, further comprising migrating, via a migrator scheduler, documents from the primary quick content collection to the at least one main collection.

10. The method of claim 6, wherein the version indicator comprises a date and time stamp.

* * * * *